United States Patent

[11] 3,579,095

[72] Inventor Ronald Richard Norley
Indianapolis, Ind.
[21] Appl. No. 829,970
[22] Filed June 3, 1969
[45] Patented May 18, 1971
[73] Assignee RCA Corporation

[54] CIRCUITS USING TRANSISTORS TO PROVIDE VARIABLE PHASE SHIFT
8 Claims, 4 Drawing Figs.

[52] U.S. Cl. .... 323/108, 323/119, 323/125
[51] Int. Cl. .... H03k 1/12
[50] Field of Search .... 307/262; 328/155; 323/101, 106, 108, 111, 119, 122, 124, 125, 126

[56] References Cited
UNITED STATES PATENTS
3,287,628 11/1966 Keiper, Jr. .... 323/125X
3,422,286 1/1969 Castelli .... 307/262X

*Primary Examiner*—J. D. Miller
*Assistant Examiner*—A. D. Pellinen
*Attorney*—Eugene M. Whitacre

ABSTRACT: A phase shift network for providing a variable shift for a frequency signal while maintaining the amplitude thereof relatively constant. The circuit includes first and second transistors having a common collector network and including first and second reactive networks coupled between the emitter electrodes thereof. A common return path is provided for currents flowing through the transistors and means are coupled to one of the transistor's bases to alter the conduction of the transistors, to provide a variable phase change at the collector electrodes, between a first phase angle determined by the first reactive network and a second phase angle determined by the second reactive network.

Patented May 18, 1971 3,579,095

2 Sheets-Sheet 1

Figure 1:
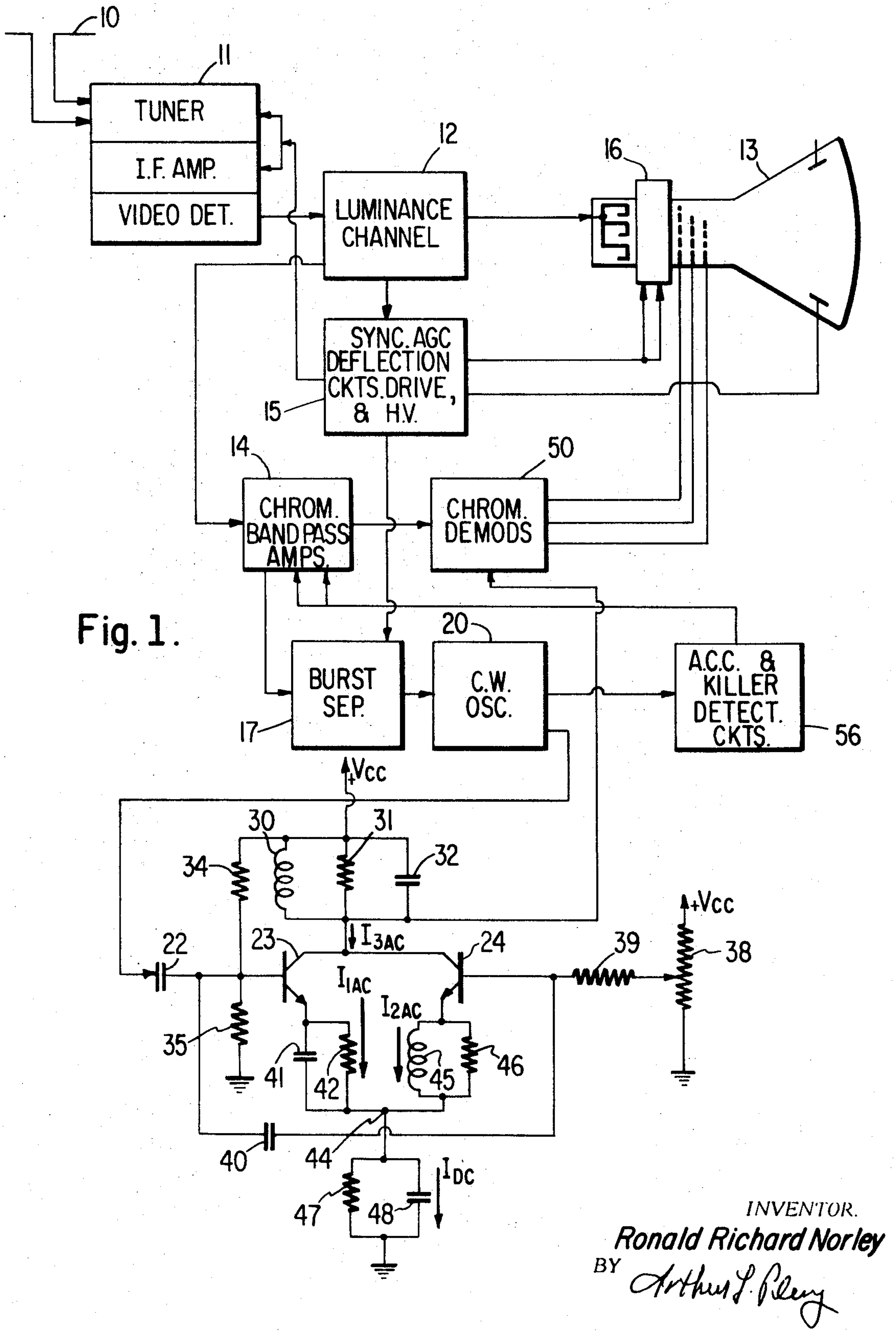

INVENTOR.
Ronald Richard Norley
BY Arthur L. Plevy
ATTORNEY

INVENTOR.
Ronald Richard Norley
BY Arthur L. Plevy
ATTORNEY

CIRCUITS USING TRANSISTORS TO PROVIDE VARIABLE PHASE SHIFT

This invention relates to circuit arrangements for shifting the phase of a continuous wave and in particular pertains to DC operating phase shift control circuits suitable for use in a television receiver.

Most conventional television receivers include a control which serves to vary the phase of the signals in the chrominance channel of the receiver, to enable the viewer to adjust the hue of the image, or the tint, to provide an optimum display according to his preferences.

Such controls are typically potentiometer or variable reactance networks which, when manually rotated, provide a phase shift of the desired signal over a relatively small range.

In remote controlled receivers the hue control may be rotated by means of a motor or other electromechanical device which is activated under the control of a remote control transmitter. In such instances the potentiometer is varied or rotated by the motor action instead of direct manual operation.

Recently, efforts concerning remote operated television receivers have resulted in receiving units which eliminate the necessity of motor or comparable electromechanical devices. Such units for example, may utilize field effect transistors and capacitors arranged in memory information storing networks. In such networks DC voltages corresponding to a desired setting for chrominance phase control, chrominance amplitude control, channel selection and so on, are retained by the storing network located in the receiver. The stored DC level is then utilized to control the appropriate functions.

In using such memory storage networks, mechanical variations and mechanical positioning of components is not desirable or easily implemented. Accordingly, variable reactance control networks used for chrominance phase control or hue control or otherwise, existing in a modern television receiver preferably would be voltage or current responsive. Many such voltage or current responding elements are known in the prior art, such as the transistor, the variable reactance diode and so on. Irrespective of the type of device utilized for such control an important consideration arises when one desires to vary the phase of the signals in the chrominance channel. While the phase of such signals is determinative of the hue or tint of the image, the amplitude of such signals is determinative of the color saturation of the image. Therefore, depending upon the type of demodulators utilized in a receiver, when one adjusts phase, one expects a desired change in color hue and does not necessarily expect an undesired change in color saturation. Many prior art configurations utilized to effect such phase changes also result in producing amplitude changes as a function of the phase setting.

Still other circuits are not easily adaptable for providing linear phase changes in response to a varying DC potential. While further circuits do not serve to maintain the amplitude of the signal relatively constant while varying the phase thereof.

It is therefore an object of the present invention to provide an improved phase control circuit operated by a DC signal for varying the phase of signals at a predetermined frequency without substantially effecting the amplitude thereof.

A further object is to provide a direct current DC operated phase control circuit using no mechanical components for varying the phase of the chrominance oscillator frequency signal in a color television receiver.

These and other objects of the present invention are accomplished in one embodiment thereof by utilizing first and second transistors having a common collector connection. A first reactive circuit is coupled between the emitter electrode of the first transistor and a common terminal, and a second reactive network is coupled between the emitter electrode of the second transistor and the common terminal. Suitable means are connected to the common terminal to provide a ground return path for AC and DC signals flowing through said transistors.

A signal to be phase shifted is applied to the base electrodes of the first and second transistors. A DC control voltage is impressed upon the base electrode of one of the transistors and serves to vary the current through both the first and second transistors. The current variations serve to alter the internal impedance of the devices while further serving to introduce more or less of the reactive emitter impedances at the common collector electrode output terminal.

In this manner the variable phase signal at said frequency is obtainable at the collector electrode terminal which signal further possesses a constant amplitude over a predetermined phase variation due to the compensating action of the varying internal impedance of the transistor devices.

These and other objects will become clearer if reference is made to the foregoing specification when read in conjunction with the accompanying figures in which:

FIG. 1 is a schematic diagram partially in block form of a television receiver using a phase shift circuit according to this invention.

Figure 2A:
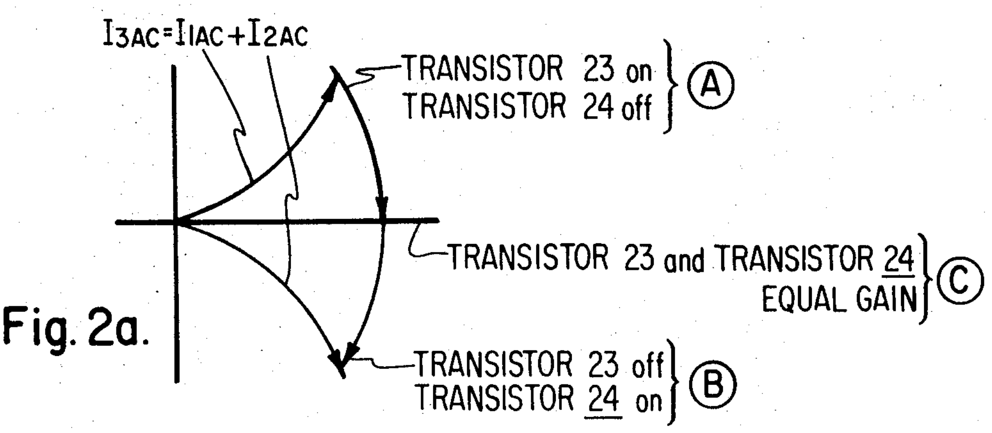
Figure 2B:
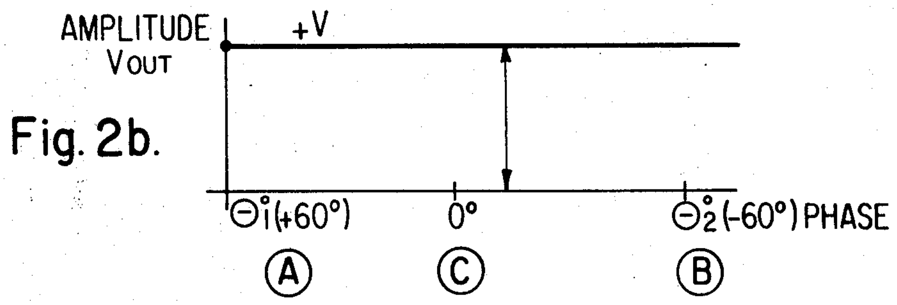

FIG. 2*a* and 2*b* are graphs of phase and amplitude response characteristics of the phase shift network according to this invention.

Figure 3:
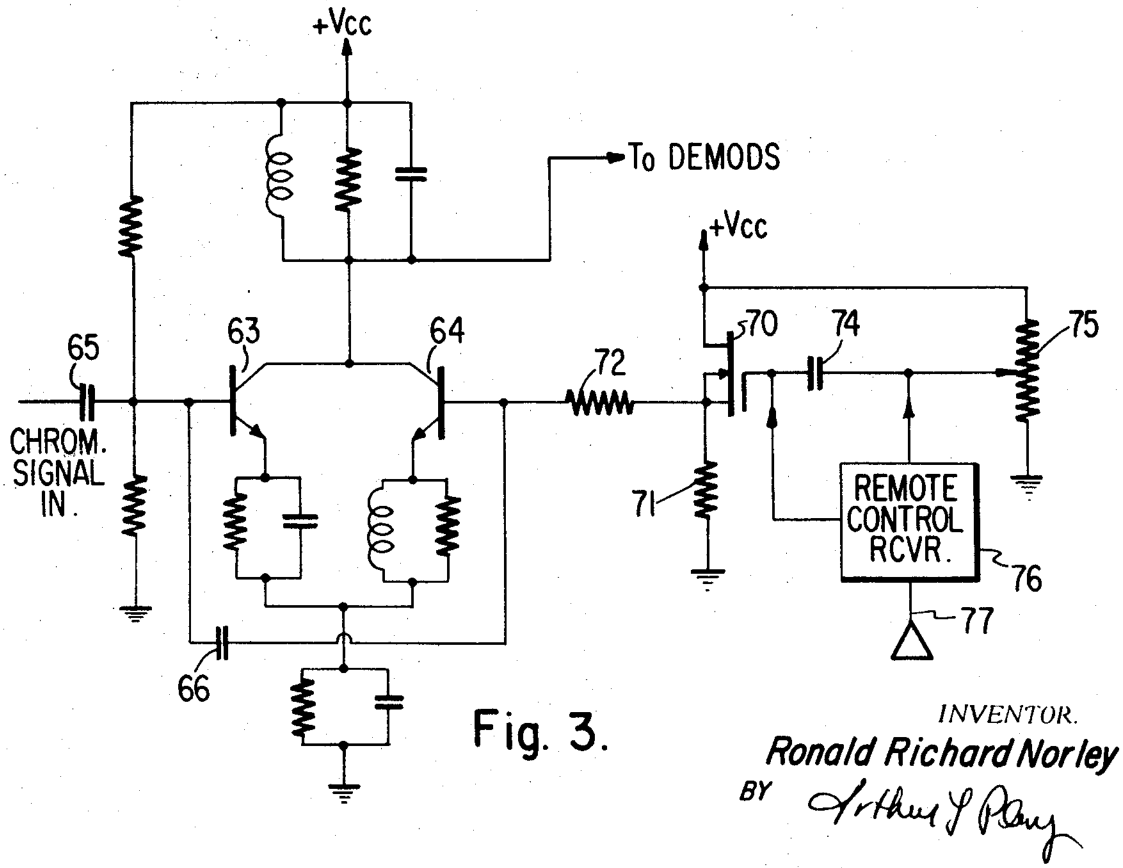

FIG. 3 is a schematic diagram of an alternate embodiment of a phase control circuit according to this invention.

Referring to FIG. 1 there is shown a schematic diagram partially in block form of a television receiver using a direct current DC controllable phase circuit according to this invention.

A television antenna 10 is adapted to receive radio frequency signal transmissions in the television band, and couple such signals to the input terminals of a signal processing circuit 11.

Circuit 11 by means of a tuner and an IF amplifier conventionally selects and processes the RF signals, and by means of a video detector provides a demodulated video signal containing information pertinent to the final display content, including synchronization and other information. The video signal, containing information pertinent to the monochrome content of the transmitted scene, is conventionally applied to the luminance amplifier channel 12, having an output for driving a color kinescope display device 13. Output signals from the luminance channel 12 are applied to the synchronization, AGC, deflection and high voltage generating circuitry 15 to assure the formulation of a stable raster by the kinescope 13, in providing synchronized vertical and horizontal wave shapes to the deflection coil 16 associated with the kinescope 13.

The circuitry 15 further provides stable operating potentials for the kinescope 13, which may be a three gun shadow mask device.

The video signal is further coupled to a chrominance channel having a chrominance band-pass amplifier stage 14 for processing and amplifying the higher frequency components of the composite signal containing the chrominance sidebands transmitted with the composite signal during a color transmission. An output from an early chrominance amplifier stage is coupled to a burst separator module 17 which is keyed by means of a horizontal pulse derived from circuit 15 to separate the burst from the remainder of the transmitted color signal. The burst signal being representative of the frequency and phase of the chrominance subcarrier wave is used to synchronize a chrominance oscillator (CW) circuit 20. The burst locked output of the chrominance oscillator 20 is then applied to an input terminal of a phase shift network, according to this invention, by means of the coupling capacitor 22.

Capacitor 22 is coupled between an output of the CW oscillator 20 and the base electrode of a transistor 23. Transistor 23 has a collector electrode coupled to the collector electrode of a second transistor 24. A source of potential, referenced as $+V_{cc}$, is applied to the collector electrode connection of transistors 23 and 24 via a parallel resonant circuit comprising inductor 30, resistor 31 and capacitor 32.

The parallel resonant circuit is selected to resonate at the frequency of the CW oscillator 20 or approximately at 3.58 MHz. Biasing for the base electrode of transistor 23 is obtained from the voltage divider comprising resistors 34 and 35 coupled between the $\pm v_{cc}$ supply and a point of reference potential. A variable bias voltage for transistor 24 is supplies by means of potentiometer 38 coupled between the $+v_{cc}$ supply and ground, and having the variable arm thereof coupled to the base electrode of transistor 24 via a resistor 39. The CW oscillator signal as applied to the base electrode of transistor 23 is also applied to the base electrode of transistor 24 by means of capacitor 40. A first reactive network comprising the shunt combination of capacitor 41 in parallel with a resistor 42 is coupled between the emitter electrode of transistor 23 and a terminal 44. A second reactive network comprising the combination of inductor 45 and resistor 46 is coupled between the emitter electrode of transistor 24 and terminal 44. Terminal 44 is returned to ground through the shunt combination of resistor 47 and capacitor 48 which combination serves to provide a ground return for current flowing through transistors 23 and 24.

The common collector connection of transistors 23 and 24 is applied to an input terminal of chrominance demodulating circuitry 50. A second input to the chrominance demodulating circuitry 50 is obtained from the chrominance band-pass amplifier circuits 14. A color difference signal is derived by the demodulators 50 by a synchronous demodulation process, provided by hetrodyning or mixing the chrominance signal, with the oscillator reference signal of a phase relationship in accordance with the color difference signals to be derived.

The phase of the color reference signal is primarily determined by the phase of the burst signal which locks or synchronizes the CW oscillator 20. However, it is frequently desirable to be able to adjust the hue of the image by adjusting the phase of the CW oscillator signal to overcome phase distortion of the image signals in transmission or to compensate for a poor transmission, or otherwise, merely for reasons of personal taste.

The FIG. further shows ACC detector and color killer stage 56 which serve, in general, to disable the chrominance channel during a monochrome transmission and to maintain the amplitude of the burst relatively constant during a color transmission.

The operation of the phase shift circuit shown and described above is as follows. Resistors 34, 35 and 47 are used to determine the biasing of the amplifier including transistors 23 and 24. Resistor 39 decouples the DC voltage control obtained from potentiometer 38. Capacitor 40 couples the CW oscillator to the base electrode of transistor 24. Primarily for purposes and ease of explanation, the AC current shown flowing into the common electrode connection of transistors 23 and 24 is referred to in the FIG. as $I_{3ac}$. The current flowing through transistor 23 as $I_{1ac}$ and the current through transistor 24 as $I_{2ac}$. Hence it can be seen that the following equation represents the relationship between the three aforementioned currents namely:

$$I_{3ac}=I_{1ac}+I_{2ac}.$$

Basically capacitor 41 and resistor 42 serve to determine the phase of $I_{1ac}$ and inductor 45 and resistor 46 serve to determine the phase of $I_{2ac}$. The collector load comprising inductor 30, resistor 31 and capacitor 32 provides a tuned output load whereby the effective load resistance due to the parallel resonance, is primarily equal in magnitude to the magnitude of resistor 31. If one varies potentiometer 38 so that the DC voltage applied to the base electrode of transistor 24 is below the base electrode voltage of transistor 23, as determined by the voltage divider comprising resistors 34 and 35, transistor 23 will be conducting and transistor 24 will be nonconducting. In this instance $I_{3ac}$ will equal $I_{1ac}$, (see FIG. 2*a*) and the output voltage will be in phase with $I_{1ac}$. When the DC voltage at the base electrode of transistor 24 is adjusted so that the base voltage at transistor 24 is above the base voltage of transistor 23, transistor 23 will be off and transistor 24 will be conducting (see FIG. 2*a*). At this extreme $I_{3ac}$ will equal $I_{2ac}$ and the output voltage at the collector electrode will be in phase with $I_{2ac}$. Between these two extremes the above equation dictates the phase of the output current $I_{3ac}$ and therefore the phase of the output voltage will be determined by the vector addition of $I_{1ac}$+I.

If the magnitudes of resistor 42 and capacitor 41 and inductor 45 and resistor 46 are properly chosen the output voltage can exhibit a phase shift between −60° and +60° which effectively provides a total phase change of output voltage of 120°. It is easily seen from the above description how the phase change can be accommodated. The constant amplitude response will now be described in conjunction with FIGS. 1 and 2.

Generally speaking if the DC current flowing from the $+V_{cc}$ supply is selected at a relatively large value, $I_{1ac}$ will be reduced only after all of $I_{2ac}$ has been added. Therefore under these conditions in undergoing a transition from +60° to −60° in phase, the voltage amplitude at the common collector electrode will start at a level V for +60° and decay to 0.89 V for +30° and will go back to V for 0°. The same amplitude phase distribution will occur from 0° to −60°. By utilizing a DC current which is relatively large compared with $I_{3ac}$, therefore serves to provide a fairly constant amplitude response, but not perfectly linear. However, if the DC current is selected to be relatively small then $I_{1ac}$ will be reduced as $I_{2ac}$ is increased. This will provide an amplitude response which starts at a given magnitude (V) for +60° decays to one-half V for 0° and goes from 0° to −60° from one-half V back to V. This, of course, is a much poorer amplitude response.

However, by selecting a DC current between the above two conditions, and further acknowledging that when the DC control voltage varies at the base electrode of transistor 24, this consequently, causes the relative currents in the transistors 23 and 24 to also vary. Such current variations in the devices at this frequency do not change with a constant phase. Generally speaking when the current in the transistor device decreases, the internal impedance between the base and emitter electrodes increases. The increases in internal impedance reduces the phase shift caused by the emitter components. This characteristic provides a compensating effect to the operation of the emitter circuits and results in a substantially constant amplitude response. In this manner FIG. 2*a* shows the actual form of the vectors $I_{1ac}$ and $I_{2ac}$ and the curve connecting the two defines the magnitude of the vector $I_{3ac}$. FIG. 2*b* shows the constant amplitude characteristics of the circuit versus phase. The constant amplitude response of such a phase shifting network is important if the phase of the chrominance signal or the burst signal is being controlled, as is done in many conventional receivers, and the circuit shown in FIG. 1 can be so employed.

However, FIG. 1 shows the circuit being utilized to control the phase of the CW oscillator signal. The amplitude of such a signal with phase control can also be extremely important when operating with various different types of chrominance demodulators 50. This is so as many such demodulators will produce a color difference signal having an amplitude effected by the amplitude of the impressed CW signal.

Referring to FIG. 3 there is shown a circuit for providing a phase control with constant amplitude of a chrominance signal applied to the base electrodes of transistors 63 and 64, by means of capacitors 65 and 66. The circuit configuration shown in FIG. 3 includes the reactive emitter network and the common collector connection between the transistors, and is similar to that shown in FIG. 1, with the exception that the DC control voltage used to vary the phase shift, as explained above, is provided for by the field effect transistor 70. Transistor 70 is arranged in a source follower configuration having a source electrode coupled to a point of reference potential through a resistor 71, and further coupled to the base electrode of transistor 54 via a resistor 72. The drain electrode of transistor 70 is returned directly to the $+V_{cc}$ supply while the gate electrode as shown, is coupled to one terminal of a capacitor 74 having another terminal coupled to the variable arm of a potentiometer 75, for applying a quiescent bias across capacitor 74. Shown coupled across the terminals of capacitor 74 is a module 76 referenced as Remote Control Receiver. Module 76 has coupled thereto an antenna element 77. In a particular remote system employing a memory storing network which utilizes the high input impedance characteristics of the field effect transistor 70, a capacitor 74 coupled to the gate electrode is changed by means of the remote control receiver 76 to a predetermined level according to the preferences of the viewer. The capacitor 74 as coupled in the circuit can not readily discharge once a charge has been impressed upon it because of the high impedance networks coupled thereto. The voltage across capacitor 74 thus appears at the source electrode of the field effect transistor 70 and serves to provide a DC control voltage for the above-described circuit resulting in a phase shift of the chrominance signals applied to the base electrodes of transistors 63 and 64, without substantially affecting the amplitude thereof.

Typical component values are given by way of example which were used in a circuit shown in FIG. 1.

Resistors:
34 10 Kilohms
35 1 Kilohms
31 10 Kilohms
38 10 Kilohms (variable)
39 10 Kilohms
Resistors:
42 470 ohms
46 330 ohms
47 2.7 Kilohms
Capacitors:
22 0.01 microfarad
32 47 micromicrofarads
40 0.01 microfarad
41 270 micromicrofarads
48 0.01 microfarads
Inductors:
30 47 microhenries
45 10 microhenries
Transistors:
23, 24 2N3693
$\pm V_{cc}$ +30 volts
Signal applied to the base Approximately 3,58 MHz.

I claim:

1. Apparatus for providing a variable phase shift, for an AC signal, comprising, a. first and second transistors having base, collector and emitter electrodes, having the collector electrode of said first coupled to the collector electrode of said second transistor,
b. a first two terminal reactive network having one terminal coupled to the emitter electrode of said first transistor,
c. a second two terminal reactive network having one terminal coupled to the emitter electrode of said second transistor,
d. first means coupled to said other terminals of said first and second reactive networks for providing a ground return path for said emitter electrodes of said first and second transistors,
e. second means coupled to said base electrodes of said first and second transistors for applying to said base electrodes said AC signal, and
f. third means for varying the current through one of said transistors relative to the other to vary the effective complex impedance at said collector electrodes due to said first and second reactive networks and said first and second transistor impedances, for varying the phase shift of said AC signal.

2. The apparatus according to claim 1 wherein said first reactive network comprises, a. a first resistor coupled between the emitter electrode of said first transistor and said first means, and
b. a capacitor in shunt with said resistor.

3. The apparatus according to claim 1 wherein said second reactive network comprises, a. a second resistor coupled between the emitter electrode of said second transistor and said first means, and
b. an inductor in shunt with said resistor.

4. The apparatus according to claim 2 wherein said resistor and capacitor are selected to provide a phase angle having an absolute magnitude of relatively 60° at the frequency of said signal.

5. The apparatus according to claim 1 wherein, said first and second reactive networks are selected to provide a phase angle at said frequency of substantially the same absolute magnitude but of opposite polarity.

6. Apparatus to provide a variable phase shift with a constant amplitude for a AC signal comprising, a. first and second active devices each having input, output and common terminals, and each having an internal impedance between said common and output terminals which is dependent upon a current flowing therethrough, a coupling path between said common terminal of said first device and said common terminal of said second device,
b. first and second reactive networks coupled in series between said output terminals of said first and second devices each network selected to provide a given phase shift at the frequency of said AC signal,
c. means coupled between the junction of said first and second reactive networks and a point of reference potential to provide a return path for currents flowing through said first and second active devices,
d. means coupled to the input terminals of said first and second active devices for applying said AC signal thereto, and,
e. means coupled to one of said input terminals for varying the conduction of said devices in mutually opposing directions and therefore said internal impedance to cause a phase shift to be provided to said AC signal at said common terminal in accordance with said impedance variation and said given phase shift of said reactive networks, said impedance variation being in a direction to cancel any variation in amplitude of said AC signal at said common terminal due to the action of said reactive networks.

7. The apparatus according to claim 6 wherein said first and second active devices are transistors, said common terminals being the collector electrodes thereof, said output terminals being the emitter electrodes thereof, and said input terminals being the base electrodes thereof.

8. Apparatus for providing a variable phase shift for predetermined AC signals, comprising, a. first and second active devices having input, output and common terminals, having said common terminals coupled one to another,
b. first and second reactive networks coupled in series between said output terminals of said first and second devices, said first reactive network selected to provide a phase shift of a given magnitude and polarity, said second reactive network selected to provide a phase shift substantially equal to said given magnitude but of an opposite polarity,
c. means coupled between said first and second reactive networks and a point of reference potential for providing a ground return path for current flowing through said first and second devices,
d. means coupled to said input terminals of said first and second devices for applying said AC signal thereto, and
e. means coupled to one of said input terminals of said first and second devices for varying the conduction of said first and second devices to cause a phase shift of said AC signal at said common terminal in accordance with said conduction variation and between a first phase angle determined substantially only by said conduction of said first device and said first reactive network and a second phase angle determined substantially only by said conduction of said second device and said second reactive network.